(12) United States Patent
Kwon et al.

(10) Patent No.: US 10,511,058 B2
(45) Date of Patent: Dec. 17, 2019

(54) MULTILAYER CABLE-TYPE SECONDARY BATTERY

(71) Applicant: LG Chem, Ltd., Seoul (KR)

(72) Inventors: Yo-Han Kwon, Daejeon (KR); In-Sung Uhm, Daejeon (KR); Je-Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 241 days.

(21) Appl. No.: 15/518,611

(22) PCT Filed: Nov. 2, 2015

(86) PCT No.: PCT/KR2015/011664
§ 371 (c)(1),
(2) Date: Apr. 12, 2017

(87) PCT Pub. No.: WO2016/068684
PCT Pub. Date: May 6, 2016

(65) Prior Publication Data
US 2017/0250448 A1    Aug. 31, 2017

(30) Foreign Application Priority Data
Oct. 31, 2014   (KR) .................. 10-2014-0150762
Oct. 31, 2014   (KR) .................. 10-2014-0150768

(51) Int. Cl.
*H01M 10/0587*     (2010.01)
*H01M 10/058*      (2010.01)
(Continued)

(52) U.S. Cl.
CPC ......... *H01M 10/0587* (2013.01); *H01M 2/02* (2013.01); *H01M 2/022* (2013.01);
(Continued)

(58) Field of Classification Search
None
See application file for complete search history.

(56) References Cited

U.S. PATENT DOCUMENTS

2010/0203372 A1    8/2010  Kim et al.
2010/0261071 A1   10/2010  Lopatin et al.
(Continued)

FOREIGN PATENT DOCUMENTS

EP      2757624 A1     7/2014
JP    H11297360 A    10/1999
(Continued)

OTHER PUBLICATIONS

International Search Report from PCT/KR2015/011664, dated Mar. 4, 2016.
(Continued)

*Primary Examiner* — Sin J Lee
(74) *Attorney, Agent, or Firm* — Lerner, David, Littenberg, Krumholz & Mentlik, LLP

(57) ABSTRACT

Disclosed is a multilayer cable-type secondary battery including a first electrode assembly comprising one or more first inner electrodes and a sheet-type first separation layer-outer electrode complex spirally wound to surround outer surfaces of the first inner electrodes, a separation layer surrounding the first electrode assembly to prevent short circuit of the electrodes, and a second electrode assembly comprising one or more second inner electrodes surrounding an outer surface of the separation layer and a sheet-type second separation layer-outer electrode complex spirally wound to surround outer surfaces of the second inner electrodes.

28 Claims, 10 Drawing Sheets

(51) Int. Cl.
  *H01M 10/0525* (2010.01)
  *H01M 10/052* (2010.01)
  *H01M 10/04* (2006.01)
  *H01M 4/66* (2006.01)
  *H01M 4/78* (2006.01)
  *H01M 4/75* (2006.01)
  *H01M 4/70* (2006.01)
  *H01M 4/13* (2010.01)
  *H01M 2/18* (2006.01)
  *H01M 2/02* (2006.01)

(52) U.S. Cl.
  CPC ............... *H01M 2/18* (2013.01); *H01M 4/13* (2013.01); *H01M 4/663* (2013.01); *H01M 4/668* (2013.01); *H01M 4/70* (2013.01); *H01M 4/75* (2013.01); *H01M 4/78* (2013.01); *H01M 10/0413* (2013.01); *H01M 10/0422* (2013.01); *H01M 10/0431* (2013.01); *H01M 10/052* (2013.01); *H01M 10/058* (2013.01); *H01M 10/0525* (2013.01)

(56) References Cited

U.S. PATENT DOCUMENTS

| | | | |
|---|---|---|---|
| 2011/0143184 A1* | 6/2011 | Mccarthy | H01M 2/1613 429/145 |
| 2012/0009331 A1 | 1/2012 | Kwon et al. | |
| 2012/0015239 A1 | 1/2012 | Kwon et al. | |
| 2012/0148902 A1 | 6/2012 | Kwon et al. | |
| 2012/0156554 A1 | 6/2012 | Kwon et al. | |
| 2012/0295144 A1 | 11/2012 | Kwon et al. | |
| 2014/0011065 A1 | 1/2014 | Kwon et al. | |
| 2014/0170453 A1 | 6/2014 | Kwon et al. | |
| 2014/0178726 A1 | 6/2014 | Kwon et al. | |
| 2014/0227572 A1 | 8/2014 | Kwon et al. | |
| 2014/0234681 A1 | 8/2014 | Kwon et al. | |
| 2014/0377606 A1* | 12/2014 | Kwon | H01M 10/0422 429/72 |
| 2014/0377609 A1* | 12/2014 | Kwon | H01M 10/0422 429/94 |
| 2014/0377610 A1* | 12/2014 | Kwon | H01M 10/0422 429/94 |
| 2015/0357689 A1* | 12/2015 | Park | H01M 2/027 429/120 |
| 2016/0079630 A1* | 3/2016 | Kwon | H01M 10/0422 429/94 |
| 2017/0237109 A1 | 8/2017 | Kwon et al. | |

FOREIGN PATENT DOCUMENTS

| | | | |
|---|---|---|---|
| JP | 2001110445 A | 4/2001 | |
| KR | 20090009598 A | 1/2009 | |
| KR | 20130040160 A | 4/2013 | |
| KR | 20130045219 A | 5/2013 | |
| KR | 20140029840 A | 3/2014 | |
| KR | 20140047010 A | 4/2014 | |
| WO | WO-2014182056 A1 * | 11/2014 | ........ H01M 10/0422 |

OTHER PUBLICATIONS

International Search Report from PCT/KR2015/011663, dated Mar. 4, 2016.

* cited by examiner

MULTILAYER CABLE-TYPE SECONDARY BATTERY

CROSS REFERENCE TO RELATED APPLICATIONS

The present application is a national phase entry under 35 U.S.C. § 371 of International Application No. PCT/KR2015/011664, filed Nov. 2, 2015, published in Korean, which claims the benefit of Korean Patent Application No. 10-2014-0150762 filed on Oct. 31, 2014, with the Korean Intellectual Property Office and Korean Patent Application No. 10-2014-0150768 filed on Oct. 31, 2014, with the Korean Intellectual Property Office, the disclosures of which are herein incorporated by reference in their entirety.

TECHNICAL FIELD

The present disclosure relates to a cable-type secondary battery which freely changes in shape and more specifically, to a cable-type secondary battery which improves battery capacity per length of a cable battery.

BACKGROUND ART

Recently, secondary batteries refer to devices which convert exterior electrical energy into chemical energy and store the same, and generate electricity as needed. The secondary batteries are also referred to as "rechargeable batteries" because they can be recharged repeatedly. Generally used secondary batteries include lead accumulators, nickel cadmium (NiCd) batteries, nickel hydride (NiMH) accumulators, lithium ion (Li-ion) batteries, lithium ion (Li-ion) polymer batteries, and the like. The secondary batteries are more economically and environmentally advantageous than disposable primary batteries.

Secondary batteries are currently used in applications requiring low electric power. Examples of the applications include equipment to aid to start vehicles, mobile devices, tools, uninterruptible power supplies and the like. The recent development of wireless communication technologies has brought about not only the popularization of mobile devices but also the mobilization of many kinds of conventional devices, and the demand for secondary batteries has been dramatically increasing. In addition, hybrid vehicles and electric vehicles have been commercialized for the purpose of preventing environmental pollution or the like and these next-generation vehicles utilize secondary batteries to reduce the costs and weight and to increase lifespan.

In general, most of secondary batteries have a cylindrical, prismatic, or pouch shape. This is because secondary batteries are produced by mounting an electrode assembly including a negative electrode, a positive electrode and a separation film in a cylindrical or prismatic metal can or a pouch-shaped case of an aluminum laminate sheet and incorporating an electrolyte into the electrode assembly. Because a predetermined space for mounting the secondary battery is necessary, the cylindrical, prismatic or pouch shape of the secondary batteries is disadvantageously a limitation in developing various shapes of mobile devices. Accordingly, there is a need for a new structure of secondary batteries which are easily changeable in shape.

In response to this need, cable-type batteries having a very high ratio of length to cross-sectional diameter have been suggested. However, when active materials used for cable-type batteries are coated above a predetermined thickness or load in order to increase a battery capacity per unit length of cable-type batteries, there are problems such as increased thickness of active material layers, thus increase in electrode resistances and thus deterioration of battery performances, lifespan, output characteristics and the like. Accordingly, there is a limitation in improving battery capacity.

DISCLOSURE

Technical Problem

Accordingly, the present disclosure is designed to solve the problems of the related art and therefore the present disclosure is directed to providing a multilayer cable-type secondary battery including a negative electrode and a positive electrode which are alternately formed in order to increase a battery capacity per unit length of a cable-type battery.

Technical Solution

In one aspect of the present disclosure, there is provided a multilayer cable-type secondary battery including: a first electrode assembly including one or more first inner electrodes and a sheet-type first separation layer-outer electrode complex spirally wound to surround outer surfaces of the first inner electrodes; a separation layer surrounding the first electrode assembly to prevent short circuit of the electrodes; and a second electrode assembly including one or more second inner electrodes surrounding an outer surface of the separation layer and a sheet-type second separation layer-outer electrode complex spirally wound to surround outer surfaces of the second inner electrodes.

In a preferred embodiment of the present disclosure, the first inner electrodes may include one or more wire-type inner electrodes disposed in parallel or two or more wire-type inner electrodes disposed to be twisted together.

In another preferred embodiment of the present disclosure, the second inner electrodes may include one or more wire-type inner electrodes spirally wound to surround the outer surface of the separation layer.

In another preferred embodiment of the present disclosure, the inner electrodes may include an inner current collector and an inner electrode active material layer formed on a surface of the inner current collector.

In another preferred embodiment of the present disclosure, the sheet-type separation layer-outer electrode complexes may have a strip structure which extends in a side direction.

In another preferred embodiment of the present disclosure, the sheet-type separation layer-outer electrode complexes may be spirally wound such that the sheet-type separation layer-outer electrode complexes do not overlap one another.

In another preferred embodiment of the present disclosure, the sheet-type separation layer-outer electrode complexes may be spirally wound such that the sheet-type separation layer-outer electrode complexes do not overlap one another while being spaced from one another by a distance less than 2-fold of a width of the sheet-type separation layer-outer electrode complexes.

In another preferred embodiment of the present disclosure, the sheet-type separation layer-outer electrode complexes may be spirally wound such that the sheet-type separation layer-outer electrode complexes overlap one another.

In another preferred embodiment of the present disclosure, the sheet-type separation layer-outer electrode complexes may be spirally wound such that a width of an overlapping part is less than 0.9-fold of the width of the sheet-type separation layer-outer electrode complexes.

In another preferred embodiment of the present disclosure, the sheet-type separation layer-outer electrode complex may include: an outer current collector; an outer electrode active material layer formed on one surface of the outer current collector; and a porous first support layer formed on the other surface of the outer electrode active material layer.

In another preferred embodiment of the present disclosure, the sheet-type separation layer-outer electrode complex may further include a conductive material coating layer including a conductive material and a binder on the first support layer in the separation layer-outer electrode complex.

In another preferred embodiment of the present disclosure, the sheet-type separation layer-outer electrode complex may further include an organic/inorganic porous coating layer including inorganic particles and a binder polymer on the first support layer in the separation layer-outer electrode complex.

In another preferred embodiment of the present disclosure, the sheet-type separation layer-outer electrode complex may include a porous second support layer formed on the other surface of the outer current collector.

In another preferred embodiment of the present disclosure, the sheet-type separation layer-outer electrode complex may have four side surfaces of corresponding to a height of the sheet and the four side surfaces may be surrounded by a polymer layer causing no electrochemical reactions.

In another preferred embodiment of the present disclosure, the separation layer may be wound.

In another preferred embodiment of the present disclosure, the inner electrode may be a negative electrode or a positive electrode, and the outer electrode may be a positive electrode or a negative electrode corresponding to the inner electrode.

In another preferred embodiment of the present disclosure, the multilayer cable-type secondary battery may further include a protection coating surrounding an outer surface of the second electrode assembly.

In another preferred embodiment of the present disclosure, the multilayer cable-type secondary battery may include: one or more first inner electrodes; and one or more second inner electrodes, wherein each of the first inner electrodes has a hollow structure whose central part is empty.

In another preferred embodiment of the present disclosure, the first and second inner electrodes may each independently include one or more wire-type inner current collectors being spirally wound, or one or more sheet-type inner current collectors being spirally wound.

In another preferred embodiment of the present disclosure, the first and second inner electrodes may include two or more wire-type inner current collectors being spirally wound while crossing one another.

In another preferred embodiment of the present disclosure, the first and second inner electrodes may each independently include an inner electrode active material layer formed over the entire surface of the inner current collector, or an inner electrode active material layer formed to surround the outer surface of the wound inner current collector.

In another preferred embodiment of the present disclosure, the first and second inner electrodes may further include a polymer support layer formed on the surface of the inner electrode active material layer.

In another preferred embodiment of the present disclosure, the multilayer cable-type secondary battery may further include a core for inner electrode current collectors, a core for supplying lithium ions including an electrolyte or a filling core, formed in the empty area in the first inner electrode.

In another preferred embodiment of the present disclosure, the core for inner electrode current collectors may be made of carbon nanotube; stainless steel; aluminum; nickel; titanium; sintered carbon; copper; stainless steel surface-treated with carbon, nickel, titanium or silver; an aluminum-cadmium alloy; a non-conductive polymer surface-treated with a conductive material; or a conductive polymer.

In another preferred embodiment of the present disclosure, the core for supplying lithium ions may include a gel-type polymer electrolyte and a support.

In another preferred embodiment of the present disclosure, the core for supplying lithium ions may include a liquid electrolyte and a porous carrier.

In another preferred embodiment of the present disclosure, the filling core may include a polymer resin, rubber, or inorganic compound, and polymer resin, rubber, or inorganic compound may have a wire, fiber, powder, mesh or foam shape.

In another preferred embodiment of the present disclosure, the outer electrode may include: an outer current collector; an outer electrode active material layer formed on one surface of the outer current collector; and a porous support layer formed on the other surface of the outer current collector.

Advantageous Effects

The present disclosure provides a cable-type battery with improved flexibility and a maximized battery capacity per unit length.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure should not be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

The present disclosure relates to a multilayer cable-type secondary battery which includes: a first electrode assembly including one or more first inner electrodes and a sheet-type first separation layer-outer electrode complex spirally wound to surround outer surfaces of the first inner electrodes; a separation layer surrounding the first electrode assembly to prevent short circuit of the electrodes; and a second electrode assembly including one or more second inner electrodes surrounding an outer surface of the separation layer and a sheet-type second separation layer-outer electrode complex spirally wound to surround outer surfaces of the second inner electrodes.

Conventional cable-type batteries have problems of increased thickness, increased resistance of electrodes and thus deterioration in battery performance and lifespan output characteristics and the like, when an electrode active material is coated above a predetermined thickness or load to increase battery capacity, thus having a limitation in thickening active material layers in order to increase battery capacity. In order to solve these problems, the present disclosure is directed to improving battery capacity per unit length of a cable battery by producing a battery with a multilayer structure including a negative electrode and a positive electrode which are alternately stacked, such as, negative electrode/positive electrode/negative electrode/positive electrode.

Hereinafter, a cable-type battery having a multilayer including the negative electrode and the positive electrode alternately stacked according to the present disclosure will be described in more detail with reference to FIGS. 1, 4 and 5.

Figure 1:
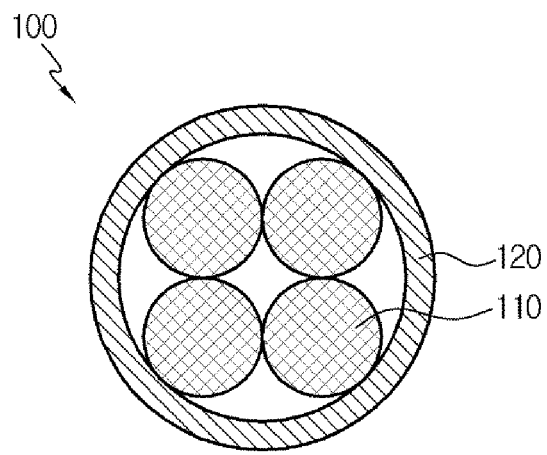
FIG. 1 is a cross-sectional view illustrating a first electrode assembly in a multilayer cable-type secondary battery according to an embodiment of the present disclosure.

Referring to FIG. 1, FIG. 1 is a cross-sectional view illustrating a first electrode assembly and the cable-type battery includes a first electrode assembly 100 including one or more first inner electrodes 110 and a sheet-type first separation layer-outer electrode complex 120 spirally wound to surround outer surfaces of the first inner electrodes 110. In addition, referring to FIG. 4, a separation layer 200 surrounding the first electrode assembly of FIG. 1, to prevent short circuit of electrodes is provided. In addition, the cable-type battery includes a second electrode assembly 300 including a second inner electrode 310 surrounding an outer surface of the separation layer 200 and a sheet-type second separation layer-outer electrode complex 320 spirally wound to surround outer surfaces of the second inner electrodes 310.

Figure 4:
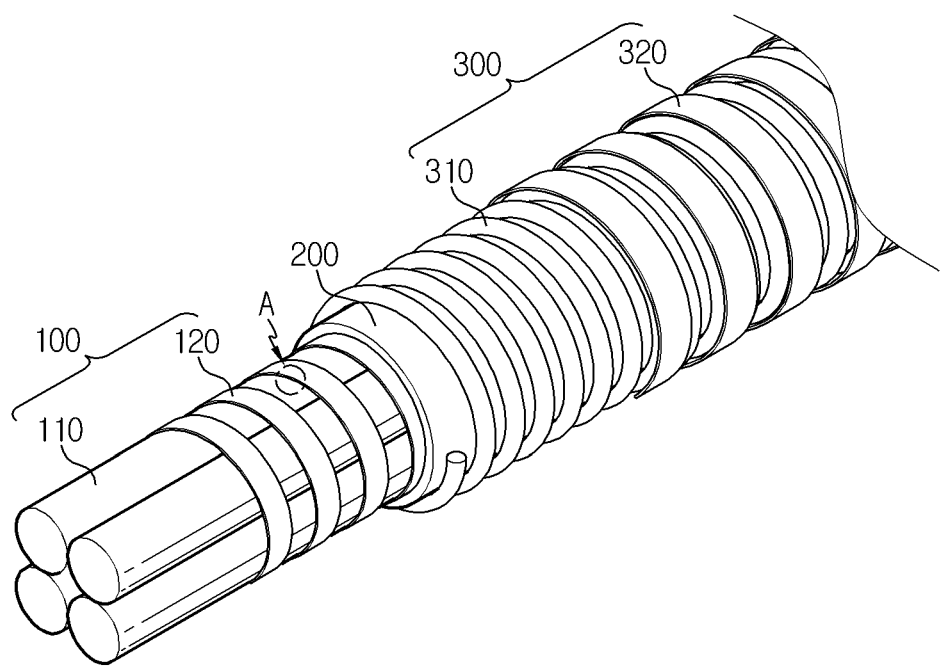
FIG. 4 is a schematic perspective view illustrating a multilayer cable-type secondary battery according to another embodiment of the present disclosure.

As such, the present disclosure is directed to improving battery capacity per unit length of a cable battery by forming the first electrode assembly and the second electrode assembly in the form of a multilayer in the cable-type secondary battery, for example, including a structure of a negative electrode/positive electrode/negative electrode/positive electrode and the present disclosure includes a multilayer cable-type battery having a multilayer structure of first electrode assembly and second electrode assembly as shown in FIG. 4 as well as a multilayer cable-type battery further including an additional electrode assembly disposed thereon.

Figure 5:
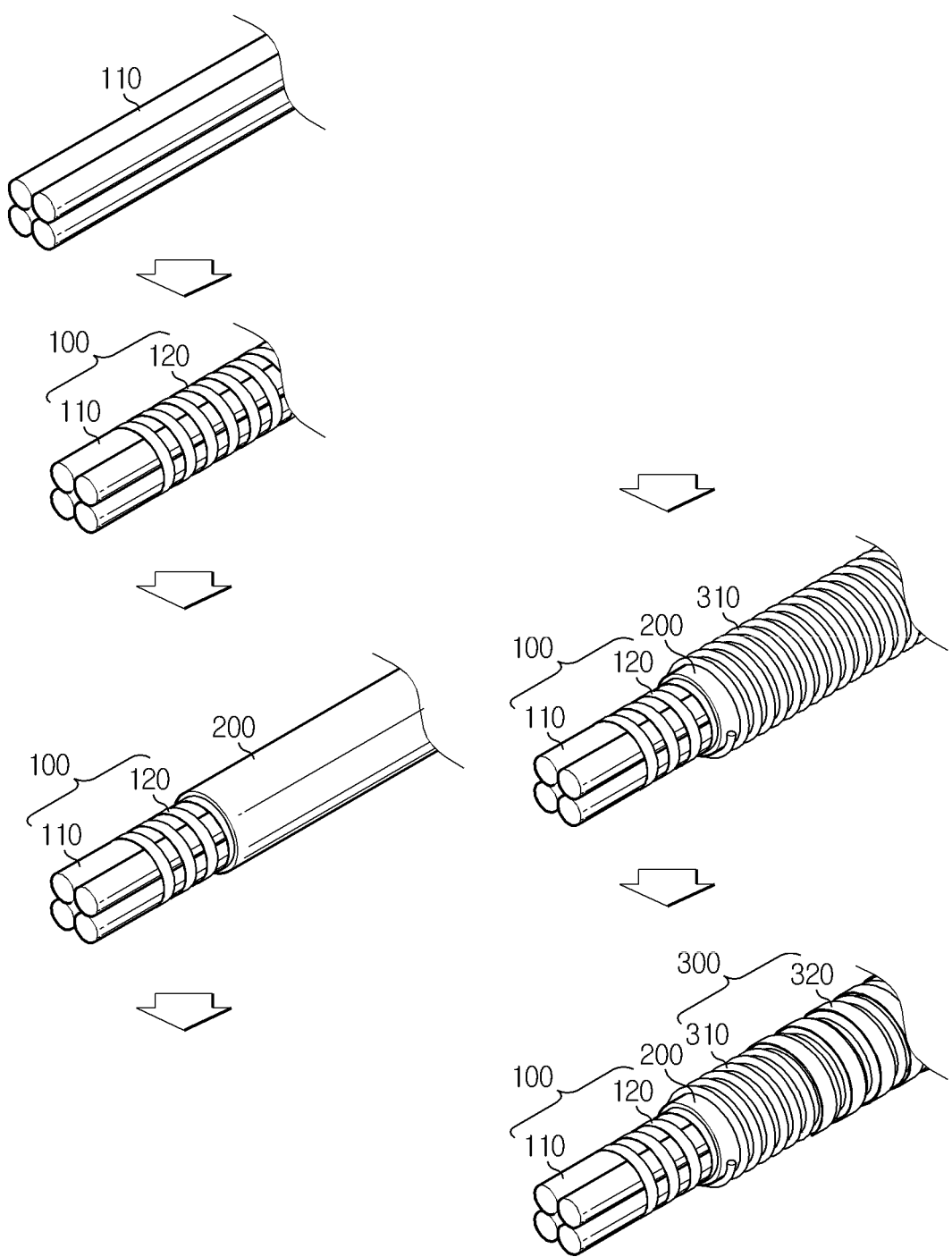
FIG. 5 is a schematic flowchart illustrating a process of producing a multilayer cable-type secondary battery according to an embodiment of the present disclosure.

A method of producing the multilayer cable-type secondary battery according to the present disclosure shown in FIG. 4 is schematically shown in FIG. 5. Referring to FIG. 5, one or more wire-type first inner electrodes 110 are disposed to be adhered to one another in parallel and a sheet-type first separation layer-outer electrode complex 120 is then wound to surround the outer surfaces of the first inner electrodes 110 to form a first electrode assembly 100. Then, the separation layer 200 is wound so as to surround the first electrode assembly. Then, a wire-type second inner electrode 310 is wound so as to surround the outer surface of the separation layer 200 and a second separation layer-outer electrode complex 320 is wound so as to surround the outer surface of the second inner electrode 310 to form a second electrode assembly 300.

Hereinafter, respective components will be described in more detail.

An inner electrode which includes the first inner electrode and the second inner electrode includes an inner current collector and an inner electrode active material layer, and more specifically includes one or more inner current collectors and an inner electrode active material layer formed on the surfaces of the inner current collectors.

Figure 2:
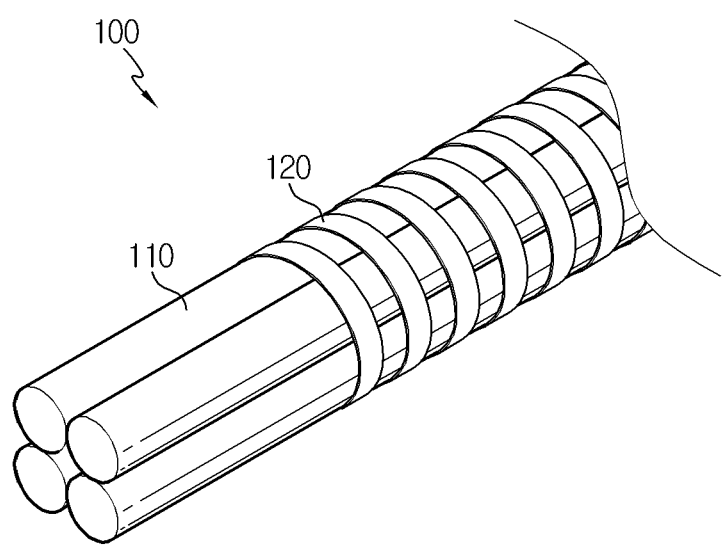
FIG. 2 is a schematic perspective view illustrating a first electrode assembly in a multilayer cable-type secondary battery according to an embodiment of the present disclosure.
Figure 3:
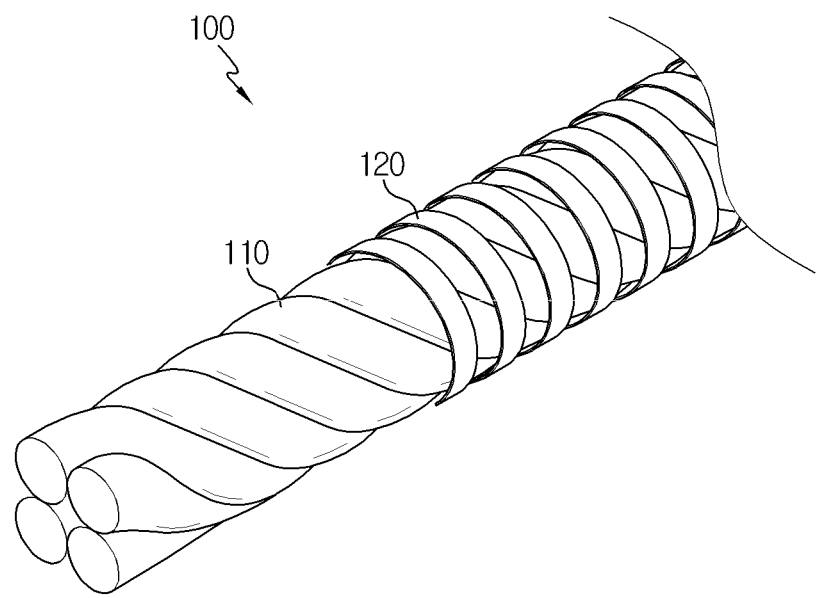
FIG. 3 is a schematic perspective view illustrating a first electrode assembly in a multilayer cable-type secondary battery according to another embodiment of the present disclosure.

In particular, regarding the first inner electrodes, one or more inner electrodes may be packed in contact with one another. According to an embodiment, two or more wire-type first inner electrodes 110 may be disposed in parallel, as shown in FIG. 2, or two or more wire-type first inner electrodes 110 may be twisted with one another, as shown in FIG. 3.

The twisted form is not limited to a certain twisted form, but several strands of negative electrodes may be placed in parallel and twisted together, or several strands of negative electrodes may be disposed to cross one another and twisted like braids of long hair.

The first inner electrodes may be densely packed together as described above, thereby reducing the inner diameter of the multilayer cable-type battery according to the present disclosure.

In addition, the second inner electrode surrounds the outer surface of the separation layer described later, and more specifically, the second inner electrode may surround the outer surface of the separation layer while being wound on the outer surface in a wire-form.

The second inner electrode may include one or more wire-type inner current collectors being spirally wound, two or more wire-type inner current collectors being spirally wound while crossing one another, or one or more sheet-type inner current collectors being spirally wound. In addition, the inner electrode active material layer may be formed over the entire surface of the inner current collector or the inner electrode active material layer may be formed to surround the outer surface of the wound inner current collector. More specifically, regarding a structure in which the inner electrode active material layer is formed over the entire surface of the wire-type inner current collector, one wire-type inner electrode having a wire-type inner current collector including an inner electrode active material layer formed on the surface thereof may be present, or two or more wire-type inner electrodes having two or more wire-type inner current collectors including an inner electrode active material layer formed on the surface thereof may be wound so as to cross one another. When two or more wire-type inner electrodes are wound together as described above, there is an advantage of improvement of rate characteristics of batteries.

In addition, regarding a structure in which the inner electrode active material layer of the second inner electrode surrounds the outer surface of the wound inner current collector, the inner current collector may be wound and the inner electrode active material layer may be then formed to surround the outer surface of the wound inner current collector.

In this case, the second inner electrode may further include a polymer support layer formed on the surface of the inner electrode active material layer.

When the second inner electrode further includes the polymer support layer on the surface of the inner electrode active material layer of the second inner electrode according to an embodiment of the present disclosure, crack of the surface of the inner electrode active material layer can be remarkably prevented although a wound wire-type inner electrode is used as the second inner electrode or a cable-type secondary battery is bent by exterior force or the like. As a result, detachment of the inner electrode active material layer can be further prevented and battery performances can be further improved. Furthermore, the polymer support layer may have a porous structure, facilitating incorporation of an electrolytic solution into the inner electrode active material layer and preventing an increase in electrode resistance.

As used herein, the polymer support layer may contain a polar linear polymer, an oxide-based linear polymer or a mixture thereof.

In this case, the polar linear polymer may be any one selected from the group consisting of polyacrylonitrile, polyvinyl chloride, polyvinylidene fluoride (PVDF), polyvinylidene fluoride-co-hexafluoropropylene, polyvinylidene fluoride-co-trichloroethylene, polyethylene imine, polymethyl methacrylate, polybutyl acrylate, polyvinylpyrrolidone, polyvinylacetate, polyethylene-co-vinyl acetate, polyarylate and poly-p-phenylene terephthalamide, or a mixture of two or more thereof.

In addition, the oxide-based linear polymer may be selected from the group consisting of polyethylene oxide, polypropylene oxide, polyoxymethylene and polydimethylsiloxane, and a mixture of two or more thereof.

In addition, the polymer support layer may be a porous polymer layer having a pore size of 0.01 μm to 10 μm and porosity of 5% to 95%.

In addition, the porous structure of the porous polymer layer may be formed by phase-separation or phase-conversion using a non-solvent in the production process thereof.

For example, polyvinylidene fluoride-co-hexafluoropropylene as a polymer is added to acetone as a solvent to prepare a solution having a solid content of 10% by weight. Then, 2% to 10% by weight of water or ethanol as a non-solvent may be added to the prepared solution to prepare a polymer solution.

During evaporation of the polymer solution after coating, the polymer solution undergoes phase conversion and a part of the non-solvent among phase-separated parts of the non-solvent and the polymer becomes pores. Accordingly, the size of pores can be controlled according to solubility of the non-solvent and the polymer and the content of the non-solvent.

In addition, in an embodiment of the present disclosure, the second inner electrode may be a spirally wound sheet-type which includes an inner current collector, an inner electrode active material layer formed on one surface of the inner current collector and a porous support layer formed on the other surface of the inner current collector.

In addition, a separation layer-outer electrode complex, which includes the first separation layer-outer electrode complex and the second separation layer-outer electrode complex, is a sheet-type which is spirally wound to surround the inner electrode, and in particular, the first separation layer-outer electrode complex is spirally wound to surround the first inner electrode and the second separation layer-outer electrode complex is spirally wound to surround the second inner electrode.

The separation layer-outer electrode complex according to the present disclosure is integrated by adhering a component functioning as a separation layer to prevent short circuit of electrodes to a component functioning as an outer electrode. When the separation layer-outer electrode complex according to the present disclosure is used, batteries can sufficiently function even without a conventional separation layer which should be interposed between the inner electrode and the outer electrode. That is, the electrode assembly according to the present disclosure may include a separation layer between the inner electrode and the separation layer-outer electrode complex, but short circuit of electrodes can be prevented by the separation layer-outer electrode complex although the electrode assembly does not include a separation layer.

In addition, the separation layer-outer electrode complex is a sheet-type. This is because, in a case in which the separation layer-outer electrode complex is used in a wire-type like conventional outer electrodes, although the wire-type requires formation of an outer electrode active material layer by dip coating, thus protecting its original shape under outer bending/twisting conditions by protection coating, crack may occur on the surface of the outer electrode active material layer and there is a disadvantage in terms of electrode flexibility. Accordingly, in the present disclosure, a sheet-type separation layer-outer electrode complex being spirally wound is incorporated as the separation layer-outer electrode complex.

As used herein, the term "spiral" includes spiral or helix, refers to a shape twisted and distorted to a predetermined level and is collectively called general spring-like shapes.

In addition, as used herein, the term "winding" refers to enclosing an outside of an object by surrounding the same and may be used to represent the same meaning as coiling.

The separation layer-outer electrode complex may have a strip structure which extends in a side direction.

In addition, the separation layer-outer electrode complexes may be spirally wound such that they do not overlap one another. In this case, the separation layer-outer electrode complexes may be spirally wound such that they are spaced from one another by a distance less than 2-fold of the width of the outer electrode, to avoid deterioration in performance of batteries.

In addition, the separation layer-outer electrode complexes may be spirally wound such that they overlap one another. In this case, the separation layer-outer electrode complexes may be spirally wound such that the width of an overlapping part is less than 0.9-fold of the width of the outer electrode, to prevent an excessive increase of inner resistances of batteries.

In this case, the separation layer-outer electrode complex may include an outer current collector 31 and an outer electrode active material layer 32 formed on one surface of the outer current collector. In this case, the outer current collector may be a mesh-type current collector.

FIGS. 6 to 9 are schematic sectional views illustrating the region A of the outer electrode of FIG. 4.

Figure 6:
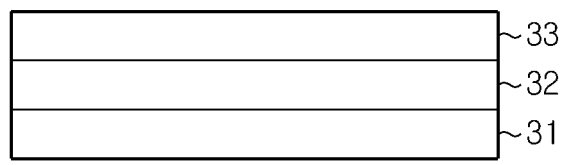
FIG. 6 is a cross-sectional view illustrating an electrode for a sheet-type secondary battery according to an embodiment of the present disclosure.
Figure 7:
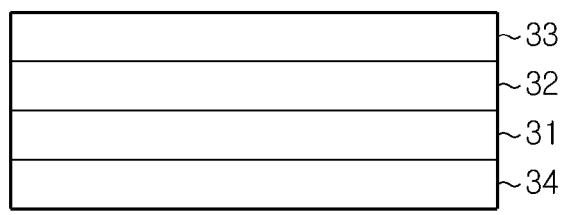
FIG. 7 is a cross-sectional view illustrating an electrode for a sheet-type secondary battery according to another embodiment of the present disclosure.

As shown in FIG. 6, the outer electrode may further include a porous first support layer 33 formed on the outer electrode active material layer 32, and the porous first support layer 33 functions as a buffer to reduce exterior force applied to the electrode active material layer 32 although exterior force such as bending or twisting is applied to electrodes, thereby preventing detachment of the electrode active material layer 32 and thus improving flexibility of electrodes. In addition, the second support layer 34 which may be additionally formed as shown in FIG. 7 can prevent open of the current collector 31 and thus further improve flexibility of the current collector 31.

In an embodiment of the present disclosure, the outer electrode may include an outer current collector, an outer electrode active material layer formed on one surface of the outer current collector and a porous support layer formed on the other surface of the outer current collector.

That is, the outer electrode may include a porous support layer formed on the other surface of the outer current collector without including the first support layer, as described above, on the outer electrode active material layer.

Figure 8:
FIG. 8 is a cross-sectional view illustrating an electrode for a sheet-type secondary battery according to another embodiment of the present disclosure.
Figure 9:
FIG. 9 is a cross-sectional view illustrating an electrode for a sheet-type secondary battery according to another embodiment of the present disclosure.

In addition, the outer electrode may further include a conductive material coating layer 35 including a conductive material and a binder on the first support layer 33, as shown in FIG. 8, and the outer electrode may further include an organic/inorganic porous coating layer 36 including a mixture of inorganic particles and a binder polymer on the first support layer 33, as shown in FIG. 9.

In this case, in the organic/inorganic porous coating layer 36 including a mixture of inorganic particles and a binder polymer, the inorganic particles are bound to each other by the binder polymer such that they maintain the state of binding with one another (i.e., the binder polymer connects and immobilizes the inorganic particles), and also the porous coating layer maintains the state of binding with the first supporting layer by the binder polymer. The inorganic particles of the porous coating layer are the most densely packed while substantially coming in contact with one another and interstitial volumes created by the inorganic particles disposed in contact become pores of the porous coating layer.

The inorganic particles and the binder polymer may be mixed in a weight ratio of 20:80 to 95:5 in the organic/inorganic porous coating layer.

In this case, the inorganic particles in the organic/inorganic porous coating layer may be inorganic particles having a dielectric constant of 5 or higher, inorganic particles having the ability of transferring lithium ions or a mixture thereof. Here, the inorganic particles having a dielectric constant of 5 or higher may be any one selected from the group consisting of $BaTiO_3$, $Pb(Zr_x, Ti_{1-x})O_3$ (PZT, in which $0<x<1$), $Pb_{1-x}La_xZr_{1-y}Ti_yO_3$ (PLZT, in which $0<x<1$, $0<y<1$), $(1-x)Pb(Mg_{1/3}Nb_{2/3})O_3$-$xPbTiO_3$ (PMN-PT, in which $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, $SiO_2$, AlOOH, $Al(OH)_3$ and $TiO_2$, or a mixture of two or more thereof. In addition, inorganic particles having the ability of transferring lithium ions may be any one selected from the group consisting of lithium phosphate ($Li_3PO_4$), lithium titanium phosphate $Li_xTi_y(PO_4)_3$, $0<x<2$, $0<y<3$), lithium aluminum titanium phosphate $Li_xAl_yTi_z(PO_4)_3$, $0<x<2$, $0<y<1$, $0<z<3$), $(LiAlTiP)_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ ($Li_x$-$Si_yS_z$, $0<x<3$, $0<y<2$, $0<z<4$)-based glass and $P_2S_5$($Li_xP_yS_z$, $0<x<3$, $0<y<3$, $0<z<7$)-based glass, or a mixture of two or more thereof.

In addition, the inorganic particles in the organic/inorganic porous coating layer may have a mean particle diameter of 10 nm to 5 μm.

Meanwhile, the binder polymer in the organic/inorganic porous coating layer may be selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer and polyimide, and a mixture of two or more thereof, but is not limited thereto.

Figure 10:
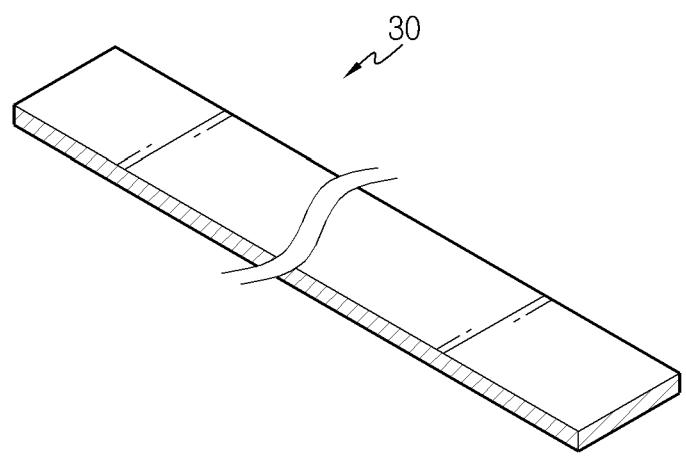
FIG. 10 illustrates a side surface corresponding to a height of the separation layer-outer electrode complex of the present disclosure, represented by hatching.

Preferably, regarding the separation layer-outer electrode complex according to the present disclosure, four side surfaces of the sheet-type separation layer-outer electrode complex corresponding to the height of the sheet may be further surrounded by a polymer layer causing no electrochemical reactions, as shown in the region represented by hatching in FIG. 10 (only front two surfaces are represented by hatching, whereas back two surfaces are hidden). Such a polymer layer encapsulates four side surfaces corresponding to the height of the sheet-type separation layer-outer electrode complex to surround a current collector layer which may be exposed to the surface corresponding to the height of the sheet with an insulating material, thereby preventing internal short-circuit. The polymer causing no electrochemical reactions includes, but is not limited to, PVdF, PVdF-HFP, polyacrylate, polyamide, polyimide, PE, PP or the like.

In addition, in a method of producing a sheet-type secondary battery according to a first embodiment, first, an electrode active material slurry is applied to one surface of the current collector (S1). Here, the current collector functions to collect electrons formed by electrochemical reactions of the electrode active material or to supply electrons required for electrochemical reactions. The current collector may be made of stainless steel; aluminum; nickel; titanium; sintered carbon; copper; stainless steel surface-treated with carbon, nickel, titanium or silver; an aluminum-cadmium alloy; a non-conductive polymer surface-treated with a conductive material; a conductive polymer; a metal paste including metal powders of Ni, Al, Au, Ag, Pd/Ag, Cr, Ta, Cu, Ba or ITO; or a carbon paste including carbon powders of graphite, carbon black or carbon nanotube.

As described above, when external force such as bending or twisting is applied to the secondary battery, the electrode active material layer may be detached from the current collector. Accordingly, a great amount of binder ingredient may be incorporated into the electrode active material layer for electrode flexibility. However, such great amount of binder may be readily peeled off from the current collector due to swelling by the electrolytic solution, thus causing deterioration in battery performance.

Accordingly, for the purpose of improving adhesiveness between an electrode active material layer and a current collector, the current collector may further include a primer coating layer including a conductive material and a binder. In this case, the conductive material and the binder may be the same as those used for formation of the conductive material coating layer as described later.

In addition, the current collector may be a mesh-type current collector and may have a plurality of recesses on at least one surface thereof so as to further increase its surface area. In this case, the plurality of recesses may have a continuous pattern or an intermittent pattern. That is, the recesses may have a continuous pattern in which the recesses are spaced apart with each other in the longitudinal direction, or an intermittent pattern in which a plurality of holes are formed. The plurality of holes may be a circular or polygonal shape.

Then, a porous first support layer is formed on the applied electrode active material slurry (S2). Here, the first support layer may be a mesh-type porous membrane or a non-woven fabric. The first support layer has a porous structure as described above, thereby facilitating incorporation of the electrolytic solution into the electrode active material layer, securing ion conductivity owing to inherent excellent impregnation of electrolytic solution and preventing increase in inner resistance of batteries and thus deterioration in battery performance.

In addition, the first support layer may be made of any one selected from the group consisting of high-density polyethylene, low-density polyethylene, linear low-density polyethylene, ultrahigh molecular weight polyethylene, polypropylene polyethyleneterephthalate, polybutyleneterephthalate, polyester, polyacetal, polyamide, polycarbonate, polyimide, polyetheretherketone, polyethersulfone, polyphenyleneoxide, polyphenylenesulfide and polyethylenenaphthalate, or a mixture of two or more thereof.

Meanwhile, a conductive material coating layer including a conductive material and a binder may be further formed on the first support layer 33. The conductive material coating layer improves conductivity of the electrode active material layer, thereby reducing resistance of the electrode and preventing deterioration of battery performance.

The negative electrode exhibits similar performance to a general negative electrode because of relatively high conductivity of the negative electrode active material layer, although it does not include the conductive material coating layer, whereas the positive electrode may have increased electrode resistance and thus deteriorated performance because of low conductivity of the positive electrode active material layer. Accordingly, the conductive material coating layer is particularly advantageous when applied to the positive electrode to reduce internal resistances of batteries.

In this case, the conductive material coating layer may be a mixture of the conductive material and the binder in a weight ratio of 80:20 to 99:1. When the content of the binder increases, the resistance of electrode may be excessively increased, and when the content of the binder satisfies the range described above, excessive increases in resistances of electrodes can be prevented. Furthermore, as described above, since the first support layer functions as a buffer to prevent detachment of the electrode active material layer, although a relatively small amount of binder is present, there is no negative effect on securing flexibility of electrodes.

In this case, the conductive material may include, but is not limited to, any one selected from the group consisting of carbon black, acetylene black, ketjen black, carbon fiber, carbon nanotube and graphene, or a mixture of two or more thereof.

In addition, the binder may be any one selected from the group consisting of polyvinylidene fluoride (PVDF), polyvinylidene fluoride-co-hexafluoropropylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer and polyimide, or a mixture of two or more thereof, but is not limited thereto.

Subsequently, the resulting product of step (S2) is compressed to form an electrode active material layer integrated by adhesion between the current collector and the first support layer (S3). Meanwhile, when the electrode active material slurry is coated on one surface of the current collector and then dried to form an electrode active material layer, and a first support layer is formed thereon by lamination or the like, the electrode active material slurry binder ingredient binding the electrode active material layer to the first support layer is cured, which may not maintain strong adhesiveness between the two layers.

In addition, the porous support layer may be formed by coating the electrode active material layer with a polymer solution, instead of using the porous first support layer previously produced by the method described above. However, the porous support formed by coating with the polymer solution cannot effectively prevent detachment of the electrode active material layer caused by exterior force due to poorer mechanical properties than the porous first support layer produced by a preferred production method according to the present disclosure.

However, according to a preferred production method according to the present disclosure, before curing of the binder ingredient, a first support layer may be formed on the upper surface of the applied electrode active material slurry and coated together by a coating blade, thereby forming a electrode active material layer integrated by adhesion between the current collector and the first support layer.

Meanwhile, before the step (S1) or after the step (S3), the method may further include forming a second support layer on the other surface of the current collector by compressing. Here, the second support layer can inhibit short circuit of the current collector, thereby further improving flexibility of the current collector.

In this case, the second support layer may be a polymer film. In this case, the polymer film may be made of any one selected from the group consisting of polyolefin, polyester, polyimide and polyamide, or a mixture of two or more thereof.

In addition, the separation layer is a component which functions to prevent short circuit of electrodes and includes a separation layer interposed between the first electrode assembly and the second electrode assembly.

The separation layer of the present disclosure may be an electrolyte layer or a separator.

The electrolyte layer serving as an ion channel may be made of: a gel-type polymer electrolyte using PEO, PVdF, PVdF-HFP, PMMA, PAN or PVAc; or a solid electrolyte using PEO, polypropylene oxide (PPO), polyethylene imine (PEI), polyethylene sulfide (PES) or polyvinyl acetate (PVAc) or the like. The matrix of the solid electrolyte is preferably formed using a polymer or a ceramic glass as the backbone. In the case of typical polymer electrolytes, the ions may move very slowly in terms of reaction rate, even when the ionic conductivity is satisfied. Thus, the gel-type polymer electrolyte which facilitates the movement of ions is preferably used compared to the solid electrolyte. The gel-type polymer electrolyte has poor mechanical properties and thus may include a support to improve poor mechanical properties. The support may be a porous support or a cross-linked polymer. The electrolyte layer of the present disclosure can serve as a separation layer and thus an additional separation layer may be omitted.

The electrolyte layer of the present disclosure may further include a lithium salt. The lithium salt can improve an ionic conductivity and reaction rate. Non-limiting examples of the lithium salt may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, and lithium tetraphenylborate.

Examples of the separator may include, but is not limited to, a porous polymer substrate made of a polyolefin-based polymer selected from the group consisting of ethylene homopolymers, propylene homopolymers, ethylene-butene copolymers, ethylene-hexene copolymers, and ethylene-methacrylate copolymers; a porous polymer substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; a porous substrate made of a mixture of inorganic particles and a binder polymer; or a separator having a porous coating layer including a mixture of inorganic particles and a binder polymer formed on at least one surface of the porous polymer substrate.

In this case, in the porous coating layer including a mixture of inorganic particles and a binder polymer, the inorganic particles are bound to each other by the binder polymer such that they maintain the state of binding with one another (i.e., the binder polymer connects and immobilizes the inorganic particles), and also the porous coating layer maintains the state of binding with the porous polymer layer by the binder polymer. The inorganic particles of the porous coating layer are the most densely packed while substantially coming in contact with one another and interstitial volumes created by the inorganic particles disposed in contact become pores of the porous coating layer.

In addition, the separation layer of the present disclosure is preferably wound.

The cable-type secondary battery according to an embodiment of the present disclosure has a horizontal cross section of a predetermined shape and a linear structure which extends in a longitudinal direction with respect to the horizontal cross section. The cable-type secondary battery according to an embodiment of the present disclosure may have flexibility, so it can freely change in shape. The term "predetermined shape" used herein is not particularly limited to any shape and refers to any shape that does not damage the nature of the present disclosure.

The inner electrode of the present disclosure may be a negative electrode or a positive electrode and the outer electrode may be a positive electrode or a negative electrode corresponding to the inner electrode.

In the present disclosure, electrode active material layers allow ions to move through the current collector, and the movement of ions is caused by the interaction of ions such as intercalation/deintercalation of ions into and from the electrolyte layer.

Such electrode active material layers may be divided into a negative electrode active material layer and a positive electrode active material layer.

Specifically, when the inner electrode is a negative electrode and the outer electrode is a positive electrode, the inner electrode active material layer becomes a negative electrode active material layer and may include any one active material particles selected from the group consisting of natural graphite, artificial graphite, or carbonaceous material; lithium-titanium complex oxide (LTO), and metals (Me) including Si, Sn, Li, Zn, Mg, Cd, Ce, Ni or Fe; alloys of the metals (Me); oxides (MeOx) of the metals (Me); and complexes of the metals (Me) and carbon; and mixtures thereof, and the outer electrode active material layer becomes a positive electrode active material layer and may include any one active material selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), or a mixture of two or more thereof.

In addition, when the inner electrode is a positive electrode and the outer electrode is a negative electrode, the inner electrode active material layer may be a positive electrode active material layer and the outer electrode active material layer may be a negative electrode active material layer.

The electrode active material layer includes an electrode active material, a binder and a conductive material and is combined with a current collector to constitute an electrode. When the electrode is subject to deformation, e.g., folding or severe bending by external forces, the electrode active material is detached. Such detachment of the electrode active material causes deterioration in battery performances and battery capacity. In contrast, the spirally wound sheet-type outer current collector functions to disperse external forces upon deformation by the external forces because of elasticity thereof and thus reduces of deformation of the electrode active material layer. Accordingly, the release of an active material can be prevented.

Figure 11:
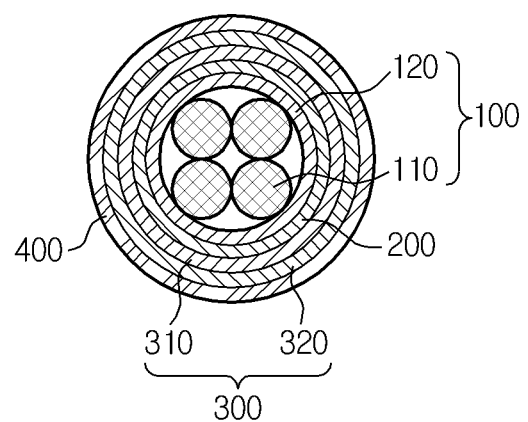
FIG. 11 is a cross-sectional view illustrating a multilayer cable-type secondary battery according to an embodiment of the present disclosure.

The cable-type secondary battery according to an embodiment of the present disclosure has a protection coating 400. Referring to FIG. 11, the protection coating acts as an insulator and is formed on the outer surface of the outermost electrode assembly in order to protect the electrodes against moisture in the air and external impacts. The protection coating may be made of conventional polymer resins having a moisture-blocking layer. In this case, the moisture-blocking layer may be made of aluminum, a liquid-crystalline polymer or the like which has excellent water-blocking ability, and the polymer resins may be PET, PVC, HDPE, epoxy resins or the like.

As shown in FIG. 11, the cable-type secondary battery according to an embodiment of the present disclosure includes; a first electrode assembly 100 including one or more wire-type first inner electrodes 110 and a sheet-type first separation layer-outer electrode complex 120 spirally wound to surround outer surfaces of the first inner electrodes;

a separation layer 200 surrounding the first electrode assembly 100 to prevent short circuit of the electrodes;

a second electrode assembly 300 including one or more second inner electrodes 310 surrounding an outer surface of the separation layer 200 and a sheet-type second outer electrode 320 spirally wound to surround an outer surface of the second inner electrode; and a protection coating 400 surrounding the outer surface of the second electrode assembly.

A brief description of a method of producing the cable-type secondary batteries is as follows. A first electrode assembly, a separation layer and a second electrode assembly are formed and a protection coating is then formed to surround the outer surface of the second electrode assembly.

The protection coating acts as an insulator and is formed on the outermost surface in order to protect the electrodes against moisture in the air and external impacts. The protection coating may be made of common polymer resins including a moisture-blocking layer as described above.

Then, a non-aqueous electrolytic solution is injected and completely sealed to produce a cable-type secondary battery.

In addition, in another aspect of the present disclosure, the multilayer cable-type secondary battery includes one or more first inner electrodes and one or more second inner electrodes as described above, wherein each of the first inner electrodes may be a hollow structure having an empty area therein.

That is, the multilayer cable-type secondary battery according to an embodiment of the present disclosure includes: a first electrode assembly including one or more first inner electrodes, each having a hollow structure having an empty area therein, and a sheet-type first separation layer-outer electrode complex spirally wound to surround outer surfaces of the first inner electrodes; a separation layer surrounding the first electrode assembly to prevent short circuit of the electrodes; and a second electrode assembly including one or more second inner electrodes surrounding an outer surface of the separation layer and a sheet-type second separation layer-outer electrode complex spirally wound to surround outer surfaces of the second inner electrodes.

Figure 12:
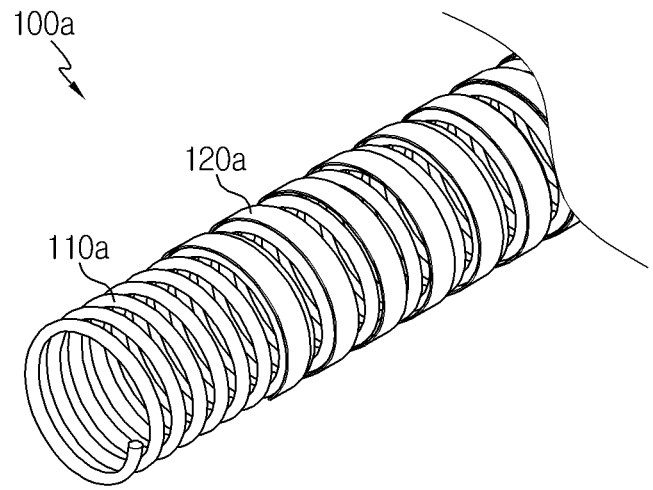
FIG. 12 is a schematic perspective view illustrating a first electrode assembly in a multilayer cable-type secondary battery according to an embodiment of the present disclosure.
Figure 13:
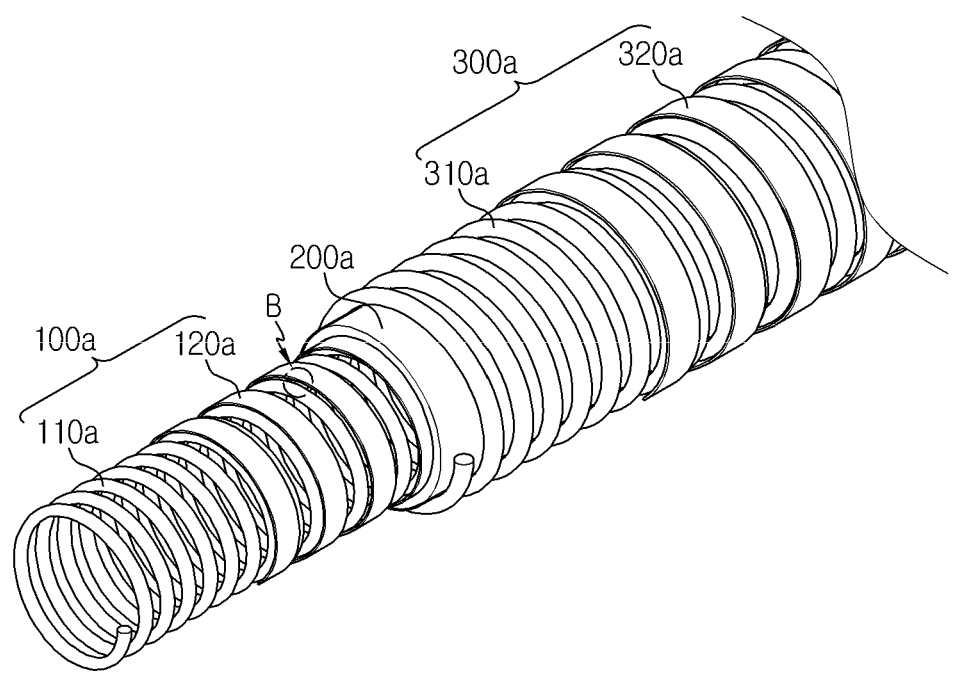
FIG. 13 is a schematic perspective view illustrating a multilayer cable-type secondary battery according to another embodiment of the present disclosure.

Referring to FIGS. 12 and 13, the multilayer cable-type secondary battery includes a separation layer 200a which surrounds the first electrode assembly of FIG. 12, to prevent short circuit of electrodes. In addition, the multilayer cable-type secondary battery includes a second electrode assembly 300a which includes a second inner electrode 310a surrounding the outer surface of the separation layer 200a, and a sheet-type second separation layer-outer electrode complex 320a being spirally wound to surround the outer surfaces of the second inner electrodes 310a.

As such, according to the present disclosure, a cable-type secondary battery has a multilayer structure of a first electrode assembly and a second electrode assembly, for example, a structure of negative electrode/positive electrode/negative electrode/positive electrode, in order to further improve capacity per unit length of the cable-type battery, and the present disclosure includes a cable-type battery including a multilayer structure of a first electrode assembly and a second electrode assembly as shown in FIG. 13, and a cable-type battery further including an additional electrode assembly thereon.

Figure 14:
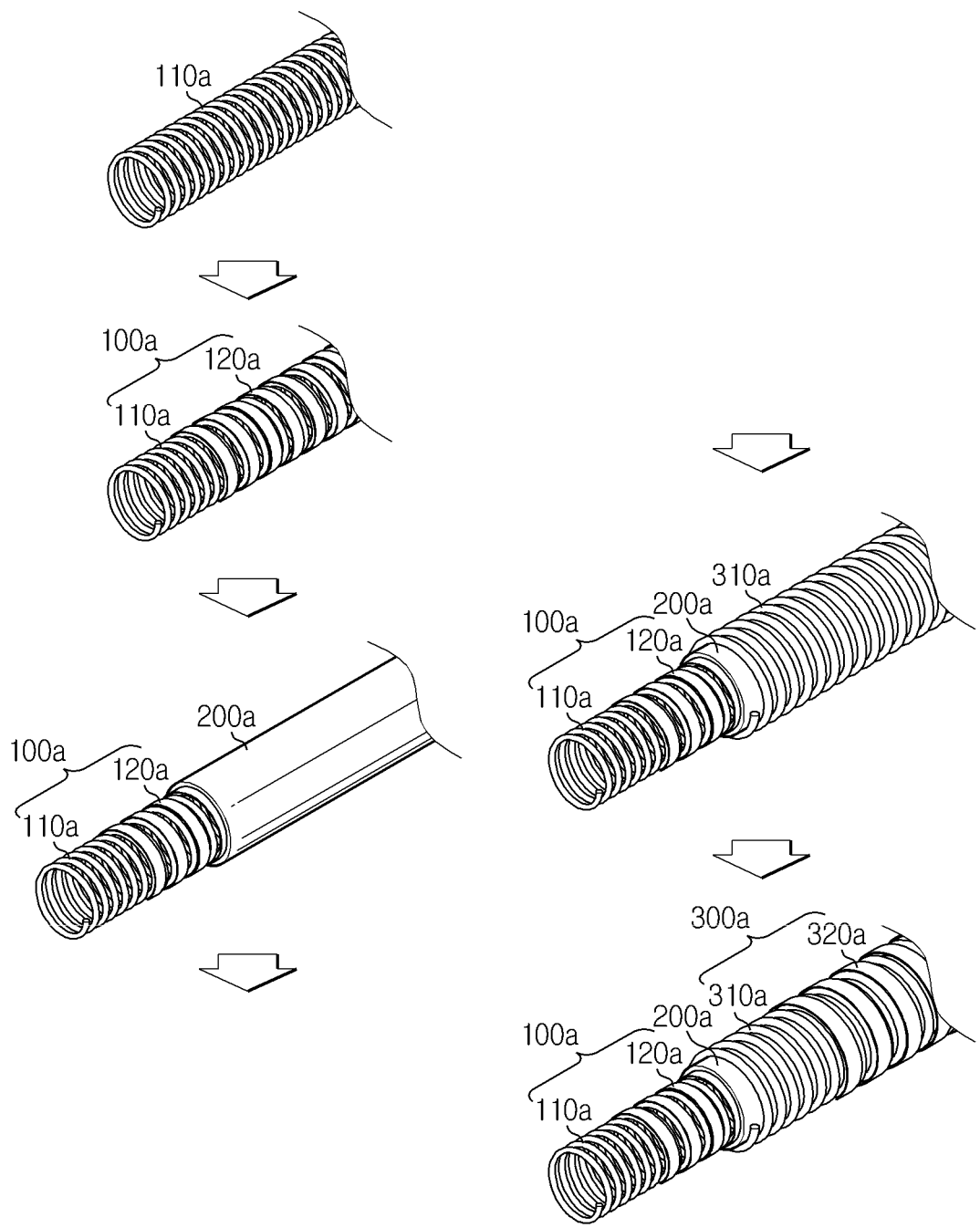
FIG. 14 is a schematic flowchart illustrating a process of producing a multilayer cable-type secondary battery according to an embodiment of the present disclosure.

The method of producing the multilayer cable-type secondary battery according to the present disclosure shown in FIG. 13 is schematically shown in FIG. 14. Referring to FIG. 14, a wire-type first inner electrode 110a is wound such that an empty space is formed therein and a sheet-type first separation layer-outer electrode complex 120a is then wound to surround the outer surface of the first inner electrode 110a to produce a first electrode assembly 100a. Then, a separation layer 200a is wound to surround the first electrode assembly. Then, a wire-type second inner electrode 310a is wound to surround the outer surface of the separation layer 200a and a second separation layer-outer electrode complex 320a is then wound to surround the outer surface of the second inner electrode 310a to form a second electrode assembly 300a.

Hereinafter, respective components will be described in more detail.

The inner electrode which includes both the first inner electrode and the second inner electrode includes an inner current collector and an inner electrode active material layer and more specifically, may include one or more inner current collectors and an inner electrode active material layer formed on the surfaces of the inner current collectors.

In addition, the inner electrode may include one or more wire-type inner current collectors being spirally wound, two or more wire-type inner current collector being spirally wound to cross one another, or one or more sheet-type inner current collector being spirally wound.

In addition, the inner electrode active material layer may be formed over the entire surface of the inner current collector, or the inner electrode active material layer may be formed to surround the outer surface of the wound inner current collector.

Figure 15:
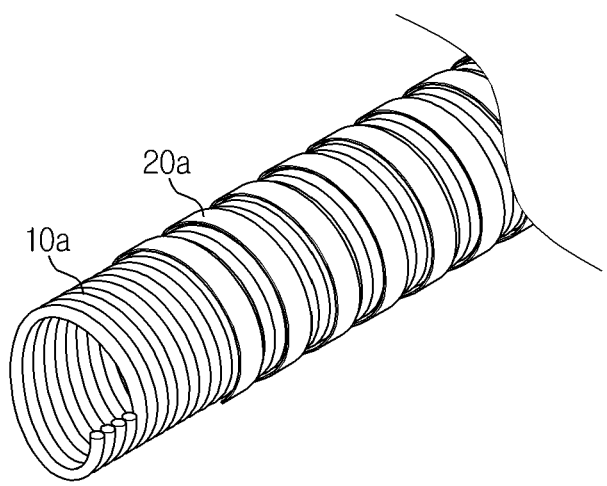
FIG. 15 a schematic perspective view illustrating an electrode assembly of a multilayer cable-type secondary battery according to another embodiment of the present disclosure.

More specifically, regarding the structure in which the inner electrode active material layer is formed over the entire surface of the inner current collector, one wire-type inner electrode having a wire-type inner current collector including an inner electrode active material layer formed on the surface thereof may be present, as shown in FIG. 13, or two or more inner electrodes 10a having two or more wire-type inner current collectors including an inner electrode active material layer formed on the surface thereof may be wound so as to cross one another, as shown in FIG. 15. When two or more wire-type inner electrodes are wound together as described above, there is an advantage of improvement of rate characteristics of batteries.

In addition, regarding the structure in which the inner electrode active material layer is formed to surround the outer surface of the wound inner current collector, the inner current collector may be wound to form a hollow structure and the inner electrode active material layer may then surround the outer surface of the wound inner current collector.

In this case, the inner electrode may further include a polymer support layer formed on the surface of the inner electrode active material layer.

Functions, materials, pore size and porosity, formation method and the like of the polymer support layer are described as above.

In this case, in particular, the first inner electrode has a hollow structure having an empty area therein.

According to an embodiment, a core for inner electrode current collectors may be formed in the empty area in the inner electrode. The core for inner electrode current collectors may be made of carbon nanotube; stainless steel; aluminum; nickel; titanium; sintered carbon; copper; stainless steel surface-treated with carbon, nickel, titanium or silver; an aluminum-cadmium alloy; a non-conductive polymer surface-treated with a conductive material; or a conductive polymer.

According to another embodiment, a core for supplying lithium ions including an electrolyte may be formed in the empty area in the inner electrode. The core for supplying lithium ions may include a gel-type polymer electrolyte and a support. In addition, the core for supplying lithium ions may include a liquid electrolyte and a porous carrier.

According to another embodiment, a filling core may be formed in the empty area in the inner electrode. The filling core may be made of materials for improving various performances of cable-type batteries, for example, polymer resins, rubber, inorganics and the like, in addition to materials for forming the core for inner electrode current collectors and the core for supplying lithium ions, and also may have various forms such as wire, fiber, powder, mesh, foam and the like.

In addition, the second inner electrode surrounds the outer surface of the separation layer described later, and more specifically, the second inner electrode may surround the outer surface of the separation layer while being wound on the outer surface in a wire-form. In this case, the separation layer-outer electrode complex may include an outer current collector 31a and an outer electrode active material layer 32a formed on one surface of the outer current collector. In this case, the outer current collector may be a mesh-type current collector.

Figure 16:
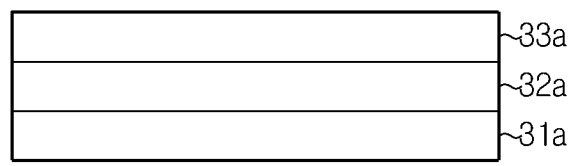
FIG. 16 is a cross-sectional view illustrating an electrode for a sheet-type secondary battery according to an embodiment of the present disclosure.
Figure 17:
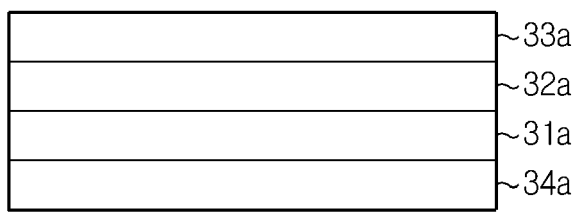
FIG. 17 is a cross-sectional view illustrating an electrode for a sheet-type secondary battery according to another embodiment of the present disclosure.
Figure 18:
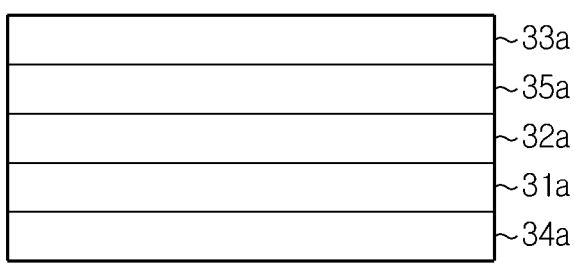
FIG. 18 is a cross-sectional view illustrating an electrode for a sheet-type secondary battery according to another embodiment of the present disclosure.

FIGS. 16 to 18 are schematic sectional views illustrating the cross-section of the region B of the outer electrode of FIG. 13.

As shown in FIG. 16, the outer electrode may further include a porous first support layer 33a formed on the outer electrode active material layer 32a and the porous first support layer 33a functions as a buffer to reduce application of external force to the electrode active material layer 32a, although exterior force such as bending or twisting is applied to electrodes, thereby preventing detachment of the electrode active material layer 32a and thus improving flexibility of electrodes. In addition, the second support layer 34a which may be additionally formed as shown in FIG. 17 can prevent open of the current collector 31a and thus further improve flexibility of the current collector 31a.

Figure 19:
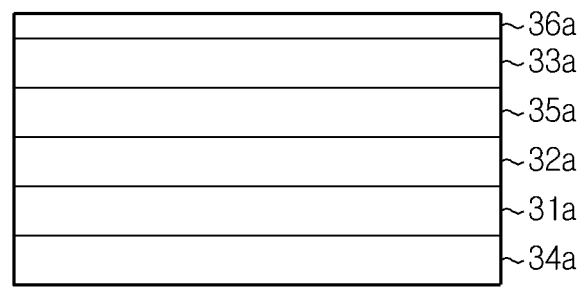
FIG. 19 is a cross-sectional view illustrating an electrode for a sheet-type secondary battery according to another embodiment of the present disclosure.
Figure 20:
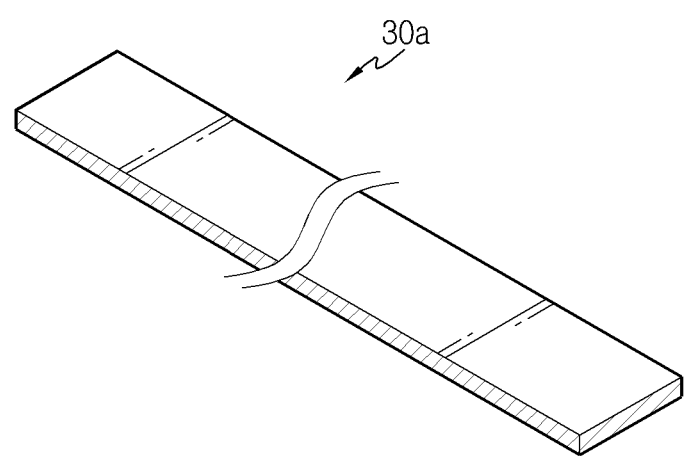
FIG. 20 illustrates a side surface corresponding to a height of the separation layer-outer electrode complex of the present disclosure, represented by diagonal lines.

In addition, a conductive material coating layer 35a including a conductive material and a binder may be further formed on the first support layer 33a, as shown in FIG. 18, and an organic/inorganic porous coating layer 36a including a mixture of inorganic particles and a binder polymer may be further formed on the first support layer 33a, as shown in FIG. 19.

In addition, examples of the separator may include, but is not limited to, a porous polymer substrate made of a polyolefin-based polymer selected from the group consisting of ethylene homopolymers, propylene homopolymers, ethylene-butene copolymers, ethylene-hexene copolymers, and ethylene-methacrylate copolymers; a porous polymer substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; a porous substrate made of a mixture of inorganic particles and a binder polymer; or a separator having a porous coating layer including a mixture of inorganic particles and a binder polymer formed on at least one surface of the porous polymer substrate.

In this case, in the organic/inorganic porous coating layer including a mixture of inorganic particles and a binder polymer, the inorganic particles are bound to each other by the binder polymer (i.e., the binder polymer connects and immobilizes the inorganic particles), and also the porous coating layer maintains the state of binding with the first supporting layer by the binder polymer. The inorganic particles of the porous coating layer are the most densely packed while substantially coming in contact with one another and interstitial volumes created by the inorganic particles disposed in contact become pores of the porous coating layer.

In particular, to facilitate transfer of lithium ions from the core for supplying lithium ions to the outer electrode as well, the separator is preferably a separator made of a non-woven fabric material corresponding to a porous polymer substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates.

Figure 21:
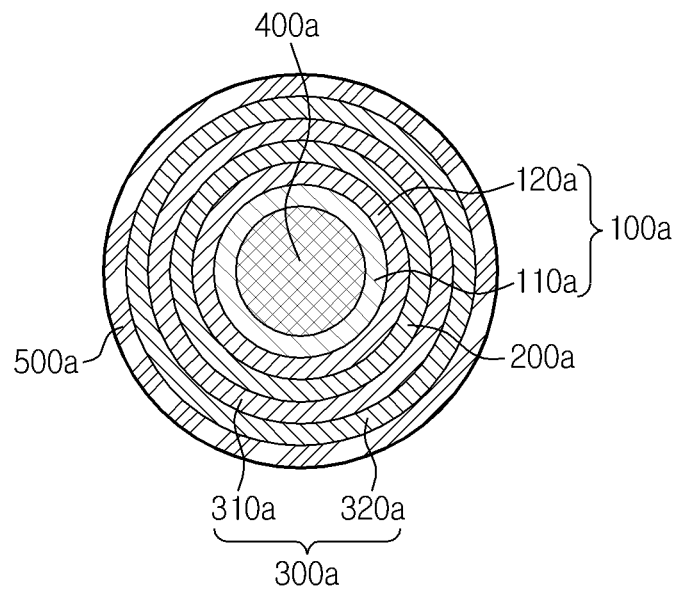
FIG. 21 is a cross-sectional view illustrating a multilayer cable-type secondary battery according to an embodiment of the present disclosure.

As shown in FIG. 21, the cable-type secondary battery according to an embodiment of the present disclosure includes a first electrode assembly 100a including one first inner electrode 110a having a core 400a for supplying lithium ions in an inner empty area thereof, and a sheet-type first separation layer-outer electrode complex 120a spirally wound to surround the outer surface of the first inner electrode; a separation layer 200a surrounding the first electrode assembly 100a to prevent short circuit of electrodes; a second electrode assembly 300a including a second inner electrode 310a surrounding the outer surface of the separation layer 200a and a sheet-type second outer electrode 320a spirally wound to surround the outer surface of the second inner electrode; and a protection coating 500a surrounding the outer surface of the second electrode assembly.

Figure 22:
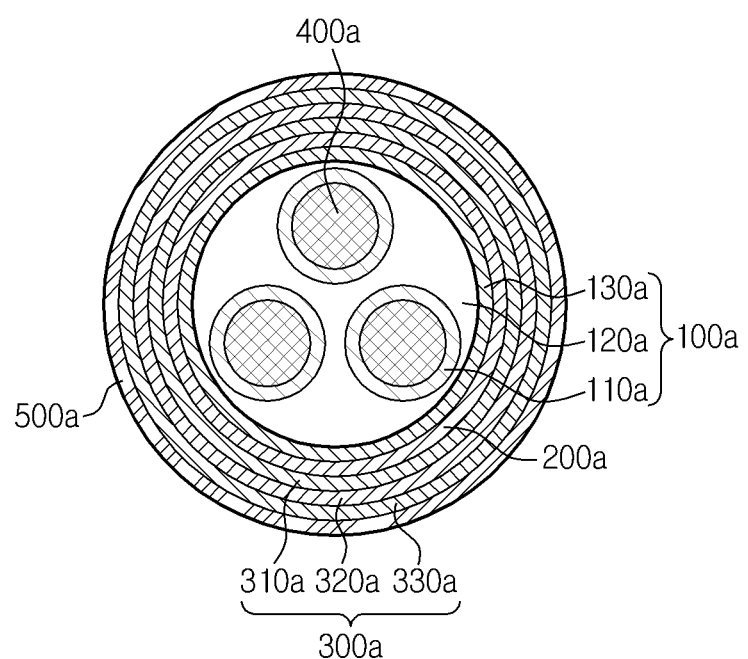
FIG. 22 is a cross-sectional view illustrating a multilayer cable-type secondary battery having two or more inner electrodes according to another embodiment of the present disclosure.

As shown in FIG. 22, the cable-type secondary battery according to yet another embodiment of the present disclosure includes a first electrode assembly including two or more first inner electrodes 110a, each having a core 400a for supplying lithium ions in an inner empty area thereof, and a sheet-type first separation layer-outer electrode complex 120a spirally wound to surround the outer surfaces of the first inner electrodes; a separation layer 200a surrounding the first separation layer-outer electrode complex to prevent short circuit of electrodes; a second electrode assembly 300a including a second inner electrode 310a surrounding the outer surface of the separation layer and a sheet-type second separation layer-outer electrode complex 320a spirally wound to surround the outer surface of the second inner electrode; and a protection coating 500a surrounding the outer surface of the second electrode assembly.

A brief description of a method of producing the cable-type secondary batteries is as follows. A first electrode assembly, a separation layer and a second electrode assembly are formed and a protection coating is then formed to surround the outer surface of the second electrode assembly.

The protection coating acts as an insulator and is formed on the outermost surface in order to protect the electrodes against moisture in the air and external impacts. The protection coating may be made of common polymer resins including a moisture-blocking layer as described above.

Then, an electrolyte is injected into an empty area formed in the central part of the inner electrode to form a core for supplying lithium ions.

The core for supplying lithium ions may be formed by incorporation of an electrolyte solution after the protection coating is formed on the outer surface of the electrode assembly, but it may be previously formed in a wire form with a polymer electrolyte using an extruder before forming the wound wire-type inner electrode, or may be previously formed by preparing a wire-type carrier made of a sponge material and then incorporating a non-aqueous electrolyte solution therein, or may be formed by preparing the inner electrode and then incorporating a non-aqueous electrolyte solution in the empty area of the central part of the inner electrode.

Then, the injection part of the electrolyte solution is completely sealed to produce a cable-type secondary battery.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

DESCRIPTION OF REFERENCE NUMERALS 110, 110a: first inner electrode
120, 120a: first separation layer-outer electrode complex
100, 100a: first electrode assembly
200, 200a: separation layer
310, 310a: second inner electrode
320, 320a: second separation layer-outer electrode complex
300, 300a: second electrode assembly
31, 31a: outer electrode collector
32, 32a: outer electrode active material layer
33, 33a: first support layer
34, 34a: second support layer
35, 35a: conductive layer
36, 36a: organic/inorganic porous coating layer
400, 500a: protection coating
400a: core for supplying lithium ions

What is claimed is:

1. A multilayer cable-type secondary battery comprising:
   a first electrode assembly comprising one or more first inner electrodes and a sheet-type first separation layer-outer electrode complex helically wound to surround outer surfaces of the one or more first inner electrodes;
   a separation layer surrounding the first electrode assembly; and
   a second electrode assembly comprising one or more second inner electrodes surrounding an outer surface of the separation layer and a sheet-type second separation layer-outer electrode complex helically wound to surround outer surfaces of the one or more second inner electrodes.

2. The multilayer cable-type secondary battery of claim 1, wherein the one or more first inner electrodes comprise one or more wire-type inner electrodes disposed in parallel or two or more wire-type inner electrodes disposed to be twisted together.

3. The multilayer cable-type secondary battery of claim 1, wherein the one or more second inner electrodes comprise one or more wire-type inner electrodes helically wound to surround the outer surface of the separation layer.

4. The multilayer cable-type secondary battery of claim 1, wherein the one or more first inner electrodes and the one or more second inner electrodes each comprises an inner current collector and an inner electrode active material layer formed on a surface of the inner current collector.

5. The multilayer cable-type secondary battery of claim 1, wherein each of the sheet-type separation layer-outer electrode complexes has a strip structure which extends in a side direction.

6. The multilayer cable-type secondary battery of claim 1, wherein each of the sheet-type separation layer-outer electrode complexes is helically wound such that the respective sheet-type separation layer-outer electrode complex does not overlap itself.

7. The multilayer cable-type secondary battery of claim 6, wherein each of the sheet-type separation layer-outer electrode complexes is helically wound such that the respective sheet-type separation layer-outer electrode complex does not overlap itself so that each pass of its helical winding is spaced from each adjacent pass by a distance less than 2-fold of a width of the respective sheet-type separation layer-outer electrode complex.

8. The multilayer cable-type secondary battery of claim 1, wherein each of the sheet-type separation layer-outer electrode complexes is helically wound such that the respective sheet-type separation layer-outer electrode complex overlaps itself.

9. The multilayer cable-type secondary battery of claim 8, wherein each of the sheet-type separation layer-outer electrode complexes is helically wound such that a width of an overlapping part is less than 0.9-fold of a width of the respective sheet-type separation layer-outer electrode complex.

10. The multilayer cable-type secondary battery of claim 1, wherein each of the sheet-type separation layer-outer electrode complexes comprises:
an outer current collector;
an outer electrode active material layer formed on one surface of the outer current collector; and
a porous first support layer formed on the outer electrode active material layer.

11. The multilayer cable-type secondary battery of claim 10, wherein each of the sheet-type separation layer-outer electrode complexes further comprises a conductive material coating layer including a conductive material and a binder on the porous first support layer.

12. The multilayer cable-type secondary battery of claim 10, wherein each of the sheet-type separation layer-outer electrode complexes further comprises an organic/inorganic porous coating layer including a mixture of inorganic particles and a binder polymer on the porous first support layer.

13. The multilayer cable-type secondary battery of claim 10, wherein each of the sheet-type separation layer-outer electrode complexes further comprises a porous second support layer formed on another surface of the outer current collector.

14. The multilayer cable-type secondary battery of claim 10, wherein each of the sheet-type separation layer-outer electrode complexes has four side surfaces corresponding to a height of the sheet-type separation layer-outer electrode complex and the four side surfaces are surrounded by a polymer layer causing no electrochemical reactions.

15. The multilayer cable-type secondary battery of claim 1, wherein the separation layer is wound.

16. The multilayer cable-type secondary battery of claim 1, wherein each of the one or more first inner electrodes and the one or more second inner electrodes is a negative electrode or a positive electrode, and each of the sheet-type second separation layer-outer electrodes includes a positive electrode or a negative electrode corresponding to the respective inner electrode.

17. The multilayer cable-type secondary battery of claim 1, further comprising:
a protection coating surrounding an outer surface of the second electrode assembly.

18. The multilayer cable-type secondary battery of claim 1, wherein each of the one or more first inner electrodes has a hollow structure having an empty area therein.

19. The multilayer cable-type secondary battery of claim 18, wherein the one or more first inner electrodes and the one or more second inner electrodes each independently comprise one or more wire-type inner current collectors being helically wound, or one or more sheet-type inner current collectors being helically wound.

20. The multilayer cable-type secondary battery of claim 18, wherein the one or more first inner electrodes and the one or more second inner electrodes each comprises two or more wire-type inner current collectors being helically wound while crossing one another.

21. The multilayer cable-type secondary battery of claim 18, wherein the one or more first inner electrodes and the one or more second inner electrodes each independently comprises an inner electrode active material layer formed over an entire surface of an inner current collector, or an inner electrode active material layer formed to surround an outer surface of a wound inner current collector.

22. The multilayer cable-type secondary battery of claim 21, wherein the one or more first inner electrodes and the one or more second inner electrodes each further comprises a polymer support layer formed on a surface of the inner electrode active material layer.

23. The multilayer cable-type secondary battery of claim 18, further comprising a core for inner electrode current collectors, a core for supplying lithium ions comprising an electrolyte, or a filling core, formed in the empty area in each of the one or more first inner electrodes.

24. The multilayer cable-type secondary battery of claim 23, wherein the core for inner electrode current collectors is made of carbon nanotube; stainless steel; aluminum; nickel; titanium; sintered carbon; copper; stainless steel surface-treated with carbon, nickel, titanium or silver; an aluminum-cadmium alloy; a non-conductive polymer surface-treated with a conductive material; or a conductive polymer.

25. The multilayer cable-type secondary battery of claim 23, wherein the core for supplying lithium ions comprises a gel-type polymer electrolyte and a support.

26. The multilayer cable-type secondary battery of claim 23, wherein the core for supplying lithium ions comprises a liquid electrolyte and a porous carrier.

27. The multilayer cable-type secondary battery of claim 23, wherein the filling core comprises a polymer resin, rubber, or inorganic compound, and the polymer resin, rubber, or inorganic compound has a wire, fiber, powder, mesh or foam shape.

28. The multilayer cable-type secondary battery of claim 1, wherein the outer electrode of at least one of the sheet-type separation layer-outer electrode complexes comprises an outer current collector, an outer electrode active material layer formed on one surface of the outer current collector, and a porous support layer formed on another surface of the outer current collector.

* * * * *